United States Patent
Kuang et al.

(10) Patent No.: US 7,496,247 B2
(45) Date of Patent: Feb. 24, 2009

(54) PLASTIC OPTICAL FIBER SENSOR

(75) Inventors: Sze-Chiang Kevin Kuang, Singapore (SG); Ser Tong Quek, Singapore (SG); Mohamed Maalej, Sharjah (AE)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 11/597,235

(22) PCT Filed: May 20, 2005

(86) PCT No.: PCT/SG2005/000155

§ 371 (c)(1),
(2), (4) Date: Mar. 21, 2008

(87) PCT Pub. No.: WO2005/114099

PCT Pub. Date: Dec. 1, 2005

(65) Prior Publication Data

US 2008/0219617 A1   Sep. 11, 2008

Related U.S. Application Data

(60) Provisional application No. 60/572,473, filed on May 20, 2004.

(51) Int. Cl.
  *G02B 6/00* (2006.01)
(52) U.S. Cl. .......................................... 385/13
(58) Field of Classification Search ................... 385/12, 385/13
  See application file for complete search history.

(56) References Cited

U.S. PATENT DOCUMENTS

| 4,293,188 | A  | 10/1981 | McMahon |
| 4,470,310 | A  | 9/1984  | Tsuruoka et al. |
| 4,547,668 | A  | 10/1985 | Tsikos |
| 4,654,520 | A  | 3/1987  | Griffiths |
| 5,384,871 | A  | 1/1995  | Devenyi |
| 6,567,173 | B1 | 5/2003  | Johannesen |
| 6,586,722 | B1 | 7/2003  | Kenny et al. |
| 6,640,647 | B1 | 11/2003 | Hong et al. |
| 6,668,105 | B2 | 12/2003 | Chen et al. |
| 2002/0109845 | A1 | 8/2002 | Inman, Jr. |

FOREIGN PATENT DOCUMENTS

| EP | 0 210 869  | 2/1987 |
| JP | 11064153 A | 3/1999 |

(Continued)

OTHER PUBLICATIONS

Derwent Publication of SU 939953, dated Jun. 30, 1982, in the name of Rost University, previously filed in the IDS of Apr. 3, 2008.

(Continued)

*Primary Examiner*—Sarah Song
(74) *Attorney, Agent, or Firm*—Christie, Parker & Hale, LLP

(57) ABSTRACT

An optical fiber sensor comprising a housing having a cavity defined therein; at least two plastic optical fibers disposed such that cleaved ends of the respective fibers are located opposite each other within the cavity; a light source coupled to one of the fibers; and a detector coupled to the other fiber.

15 Claims, 7 Drawing Sheets

FOREIGN PATENT DOCUMENTS

| JP | 2002-286530 A | 10/2002 |
| JP | 2003-270453 A | 9/2003 |
| SU | 939935 | 6/1982 |
| SU | 1076787 | 2/1984 |
| SU | 1760417 A1 | 9/1992 |

OTHER PUBLICATIONS

Derwent Publication of SU 1076787, dated Feb. 28, 1984, in the name of Kiev Civil Aviation, previously filed in the IDS of Apr. 3, 2008.

Derwent Publication of SU 1760417-A1, dated Sep. 7, 1992, in the name of Grozn Promavtomatika Sci Prodn Assoc., previously filed in the IDS of Apr. 3, 2008.

Patent Abstracts of Japan, Publication No. 11064153 A, dated Mar. 5, 1999, in the name of Naotaka Uchino et al.

Patent Abstracts of Japan, Publication No. 2002286530 A, dated Oct. 3, 2002, in the name of Takahiro Shoda.

Patent Abstracts of Japan, Publication No. 2003270453 A, dated Sep. 25, 2003, in the name of Yukio Shirokura et al.

Akira Mita, "Emerging Needs in Japan for Health Monitoring Technologies in Civil and Building Structures", 2nd International Workshop on Structural Health Monitoring, Stanford University, Sep. 8-10, 1999, pp. 1-12.

Chang, et al., "Review Paper: Health Monitoring of Civil Infrastructure", Structural Health Monitoring, vol. 2, No. 3, (2003), pp. 257-267.

Chong, et al., "Health Monitoring of Civil Infrastructures", Proceedings of the 6th NDE for Health Monitoring and Diagnostics, (2001), pp. 11-26.

Kale, et al., "The application of optical fibres as witness devices for the detection of plastic strain and cracking", Strain, vol. 16, Oct. 1980, pp. 150-154.

Kuang, et al., "Use of conventional optical fibers and fiber Bragg gratings for damage detection in advanced composite structures: A review", Appl Mech Rev., vol. 56, No. 5, Sep. 2003, pp. 493-513.

Zhou, et al., "Damage detection and assessment in fibre-reinforced composite structures with embedded fibre optic sensors -review", Institute of Physics Publishing, vol. 11, (2002), pp. 925-939.

Measures, et al., "Structurally integrated fiber optic damage assessment system for composite materials", Applied Optics, vol. 28, No. 13, Jul. 1, 1989, pp. 2626-2633.

Kuang, et al., "Detection of impact damage in thermoplastic-based fiber-metal laminates using optical fiber sensors", Journal of Materials Science Letters, vol. 21, (2002), pp. 1351-1354.

Takeda, et al., "Detection of transverse cracks by embedded plastic optical fiber in FRP laminates", SPIE Conference on Sensory Phenomena and Measurement Instrumentation for Smart Structures and Materials, vol. 3670, Mar. 1999, pp. 248-255.

Vaziri, et al., "Etched Fibers as Strain Gauges", Journal of Lightwave Technology, vol. 10, No. 6, Jun. 1992, pp. 836-841.

Djordjevich, et al., "Curvature gauge", Sensors and Actuators A, vol. 51, (1996), pp. 193-198.

Wong, et al., "Plastic Optical Fibre Sensors for Environmental Monitoring: Biofouling and Strain Applications", Strain, vol. 39, (2003), pp. 115-119.

Kuang, et al., "The use of plastic optical fibre sensors for monitoring the dynamic response of fibre composite beams", Meas. Sci. Technol., vol. 14, (2003) pp. 736-745.

Martin, et al., "A Novel Optical Fiber-Based Strain Sensor", IEEE Photonics Technology Letters, vol. 9, No. 7, Jul. 1997, pp. 982-984.

Badcock, et al., "An intensity-based optical fibre sensor for fatigue damage detection in advanced fibre-reinforced composites", Smart Mater. Struct., vol. 4, (1995), pp. 223-230.

Lee, et al., "Monitoring of fatigue damage of composite structures by using embedded intensity-based optical fiber sensors", Smart Mater. Struct., vol. 10, (2001), pp. 285-292.

httm/www.tangram.co.uk/index, "Polymer Data File: Polymethyl Methacrylate—PMMA (Acrylic)", Jan. 31, 2007, 6 pages.

Marcou et al., "Plastic Optical Fibres—Practical Application", Club des Fibres Optiques Plastiques, (1997), 4 pages.

Yun-Jiang Rao, "In-fibre Bragg grating sensors—Review Article", Meas. Sci. Technol., vol. 8, (1997), pp. 355-375.

Brooks, et al., "A multi-mode extrinsic Fabry-Pérot interferometric strain sensor", Smart Mater. Struct., vol. 6, (1997), pp. 464-469.

Kuang, et al., "Use of polymer-based sensors for monitoring the static and dynamic response of a cantilever composite beam", Journal of Materials Science, vol. 39 (2004), pp. 3839-3843.

Xu, et al., "A New Fiber Optic Based Method for Delamination Detection in Composites", Standard Health Monitoring, vol. 2, No. 3, (2003), pp. 205-223.

PLASTIC OPTICAL FIBER SENSOR

FIELD OF INVENTION

The present invention relates broadly to an optical fiber sensor, to a method of fabricating an optical fiber sensor, and to a method of sensing utilising an optical fiber sensor.

BACKGROUND

There is an increasing need to monitor environmental parameters to a high degree of accuracy using cost-effective sensors that can be integrated into the structures to monitor a range of physical parameters. Applications of these sensors include monitoring of the fabrication process of advanced composites, non-destructive testing, vibration monitoring, crack detection in load-bearing members and others. The ability to perform structural health monitoring on a continuous real-time basis is fast becoming an important design aspect in the building of new intelligent civil structures such as dams, buildings, highways, offshore platforms and other engineering structures.

Deterioration of existing structures due to normal usage and damage resulting from natural disasters such as earthquakes can lead to serious loss of structural integrity. The presence and propagation of cracks and other structural flaws frequently go undetected and can develop to a full-scale catastrophic failure leading to unnecessary loss of life and property. In addition, without the benefit of a structural health monitoring system, the structural soundness of surviving buildings is unknown except through costly and time consuming manual inspections. Frequently, these inspections are highly laborious leading inadvertently in patchy and unreliable results. The potential of structural-integrated sensors to monitor a variety of structural health indicators can assist in providing reliable and objective results leading to an informed decision by the relevant building authorities.

In response to the increasing need for structural health monitoring, various methods are being developed and some of the most promising are based on the use of optical fiber sensors.

Fiber optic sensors may be categorized according to a number of classification schemes. Based on one scheme, fiber optic sensors may be classified as intrinsic if the effect of the measurand on the light being transmitted takes place in the fiber. The sensor is classified as extrinsic if the fiber carries the light from the source and to the detector but the modulation of light occurs outside the fiber. Another classification scheme divides the fiber sensors into how the optical properties are modulated in response to the physical perturbation to be monitored. Based on this method of classification, optical fiber sensors can be divided into intensiometric, polarimetric, interferometric and wavelength-based monitoring schemes.

In the domain of intensity-based systems, a number of sensor designs have been proposed. Their attractiveness lies in their relative ease of signal interrogation, which involves monitoring the light intensity level as opposed to phase-shifts or wavelength shifts, propagated through the optical fiber. The loss of optical signal intensity occurs around the sensitized region of the optical fiber. In general, the extent of the loss of optical intensity is related to the magnitude of the external perturbation. In some intensity-based optical design, a bi-stable system approach is adopted where the loss of intensity simply indicates the occurrence of an event, which is being monitored. These intensity-based systems can, in general, offer simplicity, versatility and reliability in applications where precise signal intensity measurement is not critical or required. Intensity-based sensors can be categorized as either fracture-based or strain-based sensor. Fracture-based sensors rely on the damage or fracture of the optical fiber itself e.g. in the event of impact or overload as a direct indication of host damage and are essentially a single-use system. Strain-based sensors, on the other hand, offer the possibility of continuous strain measurement in either static or/and dynamic loading. In this approach, damage is often inferred i.e. indirectly and this is achieved by observing and analyzing the strain response of the sensor for a given loading.

To date, only glass-based optical fibers have been employed for structural health monitoring. For civil engineering applications, particular when it becomes desirable to embed optical sensors within concrete structures, the extremely alkaline (pH 12) environment is known to be corrosive to standard glass fiber. In addition, the presence of moisture can weaken the glass core and accelerates crack growth in the fiber. Protection of the glass fiber by means of a polymer coating is required to help prevent the damage of the glass fibers due to the corrosive environment. In addition, glass-based optical fiber sensors are fragile—in general not amenable to handling and are highly susceptible to fracture.

It has been proposed that the glass optical fiber can be made sensitive to the measurand of interest (e.g. strain) without altering the physical makeup of the glass optical fiber. A precision-bored capillary tube manually drawn by heating a glass tube was used to house two cleaved multi-mode glass fibers. The application of strain causes a separation of the cleaved optical fiber end-faces by the air-gap resulting in the modulation of light intensity. Although the sensitivity of the sensor may be increased by using a longer capillary tube, this is done at the penalty of increased sensor size. The longitudinal separation between the two cleaved surfaces due to the air gap offers limited sensitivity to the externally applied strain since air can be assumed to be optically transparent within the strain domain of interest. In addition, the use of a precision bore glass tube is laborious adding to the manufacturing cost of the sensor. The susceptibility of the glass tube and glass fiber to fracture also reduces the attractiveness of the proposed design.

At least preferred embodiments of the present invention seek to provide an alternative optical fiber-based sensor design, which may address one or more of the above-mentioned drawbacks of existing designs.

SUMMARY

In accordance with a first aspect of the present invention, there is provided an optical fibre sensor comprising a housing having a cavity defined therein; at least two plastic optical fibers disposed such that cleaved ends of the respective fibers are located opposite each other within the cavity; a light source coupled to one of the fibres; and a detector coupled to the other fibre.

The cavity may be filled with an opaque fluid.

The housing may be made from plastic material.

The housing may comprise a plastic tube and two plastic sleeves inserted in the plastic tube at opposite ends thereof, wherein each plastic sleeve received one of the fibers.

The sensor may further comprise a casing accommodating the housing.

The housing and each fiber may be secured to an inner surface of the casing.

The fibers may protrude from opposite ends of the casing.

The fibers may protrude from the same end of the casing.

The fibers may be made from polymethyl methacrylate, polycarbonate or CYTOP®.

The cleaved ends of the respective fibers may be separated by a gap in a quiescent state of the sensor.

The plastic material may comprise polytetrafluoroethylene, polystyrene, or polypropylene.

In accordance with a second aspect of the present invention there is provided a method of fabricating an optical fibre sensor, the method comprising forming a housing having a cavity defined therein; providing at least two plastic optical fibers disposed such that cleaved ends of the respective fibers are located opposite each other within the cavity; coupling a light source to one of the fibres; and coupling a detector to the other fibre.

The method may further comprise injecting a fluid medium into the cavity.

A cap may be provided between the cleaved ends of the respective fibers.

In accordance with a third aspect of the present invention there is provided a method of sensing utilising an optical fibre sensor, the method comprising detecting the intensity of a light signal after propagation of the light signal through at least two plastic optical fibers disposed such that cleaved ends of the respective fibers are located opposite each other, wherein the light signal is emitted from the cleaved end of one fiber and received via the cleaved end of the other fiber.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Embodiments of the present invention seek to offer a cost-effective alternative to either complement or substitute the optical fiber sensors currently being marketed and used for structural health monitoring applications. Specifically, the embodiments seek to address the deficiencies in existing designs proposed in terms of general chemical resistance, ease of handling, ease of application, and signal sensitivity.

The embodiments described provide a design that simplifies the sensor fabrication and thus reduce the cost of fabricating the sensor. This involves the employment of ready-made high quality small plastic tubes as the housing which offer good dimensional and cryogenic stability, heat resistant, fracture-proof, low coefficient of friction and ease of termination (i.e. can be easily cut into required length without application of heat).

Figure 1:
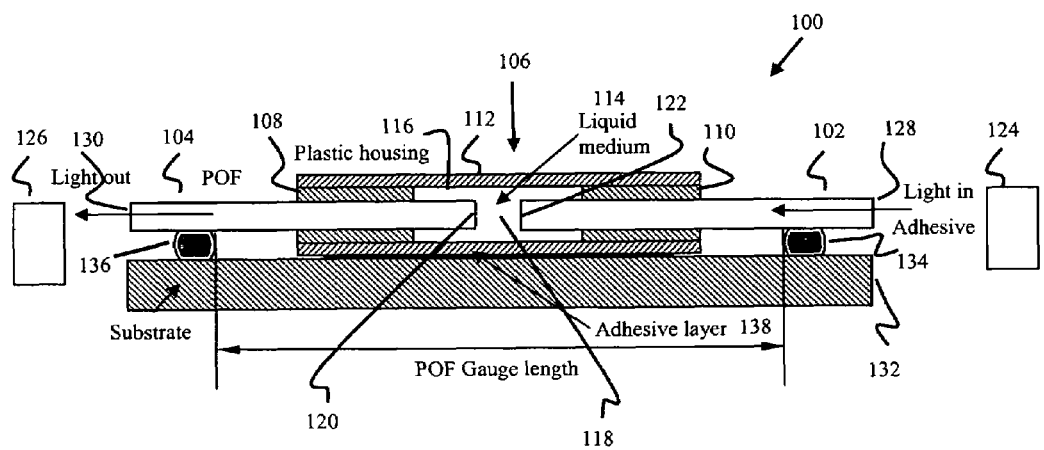
FIG. 1 is a schematic drawing of the extrinsic plastic optical fiber sensor.

FIG. 1 shows a schematic cross sectional drawing of an extrinsic POFS 100, according to an example embodiment. The polymer optical fiber 102, 104 used in this embodiment is based on a step index multimode fiber. The diameter of the optical fiber 102, 104 ranges from about 125 micrometer to about 3 millimeter in different embodiments. The optical fiber 102, 104 consists of a pure polymethyl methacrylate (PMMA) core and cladding made from fluorinated PMMA. In different embodiments, other plastic materials such as, but not limited to, Polycarbonate and CYTOP® may be used. The sensor 100 consists of two cleaved step-index multi-mode plastic optical fibers 102, 104 enclosed in a specially designed housing 106 comprising two polytetrafluoroethylene (PTFE) sleeves 108, 110 and a PTFE outer tube 112 as shown schematically in FIG. 1. PTFE tubes of various standard diameter sizes are readily available commercially. In different embodiments, other materials such as, but not limited to, Polystyrene, Polypropylene, Stainless steel, and aluminium may be used. In contrast to existing sensors construction the example embodiment requires no precision-boring nor heating for the purpose of sensor construction. The PTFE tubes 108, 110, 112 can be easily cut into the required length for the housing construction. In this embodiment, the sleeves 108, 110 are force-fitted in the tube 112 and stay in place by an interference fit, and the nominal inner diameter of the tube 112 is the same as the nominal outer diameter of the sleeves 108, 110. The fibers, 102, 104 have a sliding fit in the sleeves 110, 108 respectively.

An opaque liquid solution 114 (oil-based or water-based dye in example embodiments) is injected into the cavity space 116 (formed between the sleeves 108, 110, 112). The liquid solution 114 may be injected into the space 116 using a syringe with care to prevent air bubbles from forming in the liquid, rendering the solution inhomogeneous. Following the injection of the liquid solution 114, the lengths of plastic optical fiber 102, 104 are inserted through the sleeves 108, 110 at both ends of the housing. In order to monitor compression loading, an initial gap may be incorporated between the cleaved ends 120, 122 of the optical fibers 104, 102 respectively allowing compressive strain to be measured. The type of fluid medium may vary from e.g. a dark-coloured dye (high opacity for super-sensitivity) to a lighter-coloured dye (low opacity for large dynamic range).

A strain sensor system comprising of a light source 124 and a photo detection unit 126 is coupled to the input and output ends 128, 130 of the optical fibers 102, 104 respectively. The light source 124 operating in the visible range and invisible range may be chosen depending on the optical transmission characteristics of the plastic optical fibers 102, 104. The detection unit 126 comprises of a light dependent resistor connected to a voltage divider circuit using a resistor in conjunction with an in-line portable power supply, in the example embodiment. The voltage variation across the resistor may be monitored in real-time using a high speed digital oscilloscope or periodically based on the desired monitoring strategy. The optical fiber sensor 100 is attached to the surface of a substrate 132 to be monitored by securing the optical fibers 102, 104 at predetermined points 134, 136 along the substrate and across the plastic housing 106. A high stiffness adhesive is used in the example embodiment to secure the optical fibers 102, 104 permanently to the substrate 132 to ensure no or minimum loss of strain transfer from the substrate 132 to the sensor 100 due to shear effects of the adhesive medium 138.

Figure 2:
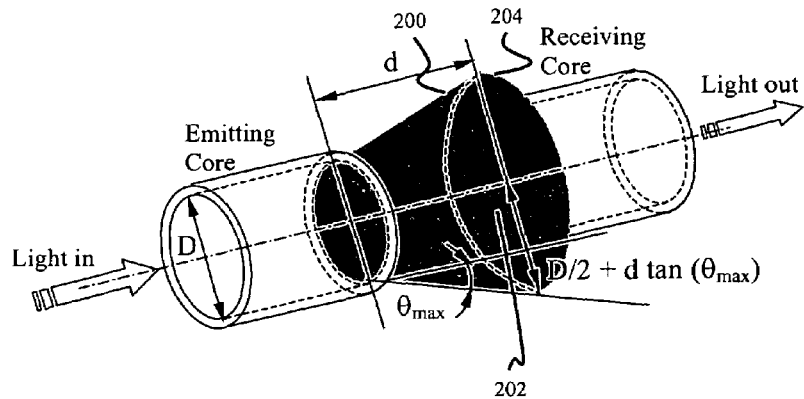
FIG. 2 is a schematic drawing illustrating the basic sensing principle of the plastic optical fiber (POF) sensor.

It will be appreciated by a person skilled in the art that in operation, the sensing capability of a polymer-based optical fiber sensor 100 (POFS) in the example embodiment utilises the modulation of the optical signal intensity with changes in the longitudinal separation of two cleaved plastic optical fibers 102, 104. The optical signal loss due to a longitudinal separation is summarized briefly here for completeness. FIG. 2 shows a schematic illustration highlighting the basic measurement principle of the POFS 100. Optical rays emitting from the source fiber emerge as a cone 200 whose half-angle at the apex is equal to $\theta_{max}$. Assuming a homogenous energy distribution, the loss (given in dB) in the optical power can be determined by taking the logarithm of the ratio of the receiving fiber core area 202 and the total area 204 illuminated by the emitting fiber core 200.

Figure 3:
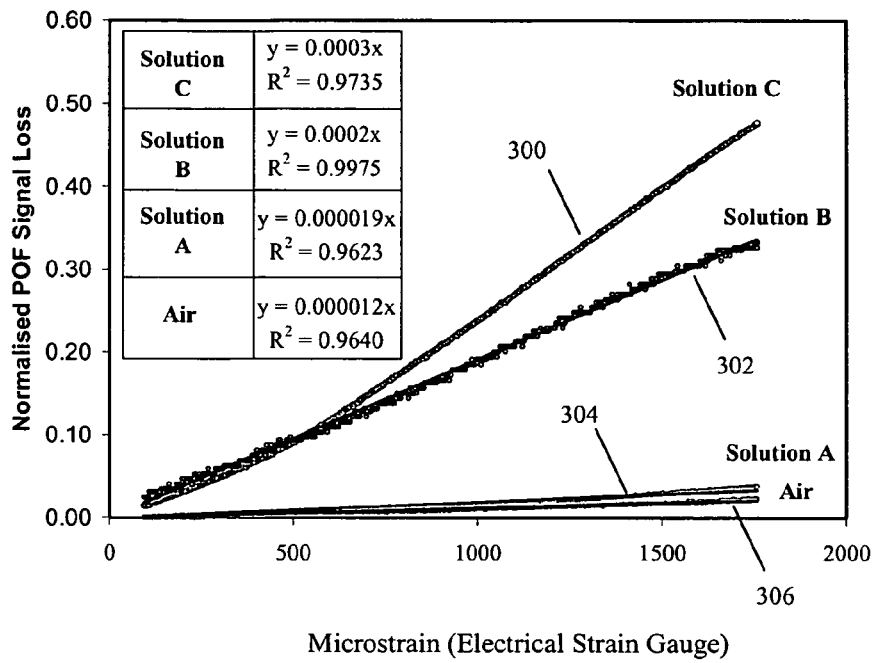
FIG. 3 shows a plot comparing the typical strain response of the four optical fiber sensors during a quasi-static loading test.

FIG. 3 shows a comparison of the strain sensitivity of a series of POF sensors in example embodiments comprising of fluid-type (curves 300, 302, 304) and air-type (curve 306) POF configuration conducted under a quasi-static tensile test. The fluid-type POF sensors refer to the sensor in which opaque solutions, in particular Solution A-Clear epoxy; Solution B-Light Brown Polishing Cream; Solution C-Black ink dye, have been injected into the cavity of the plastic housing while air-type refers to a sensor in which no solution has been injected into the cavity of the plastic housing i.e. air-filled. The result highlights the improvement in the strain response/sensitivity of the fluid-type (curves 300, 302, 304) sensor over the air-type (curve 306).

Figure 4:
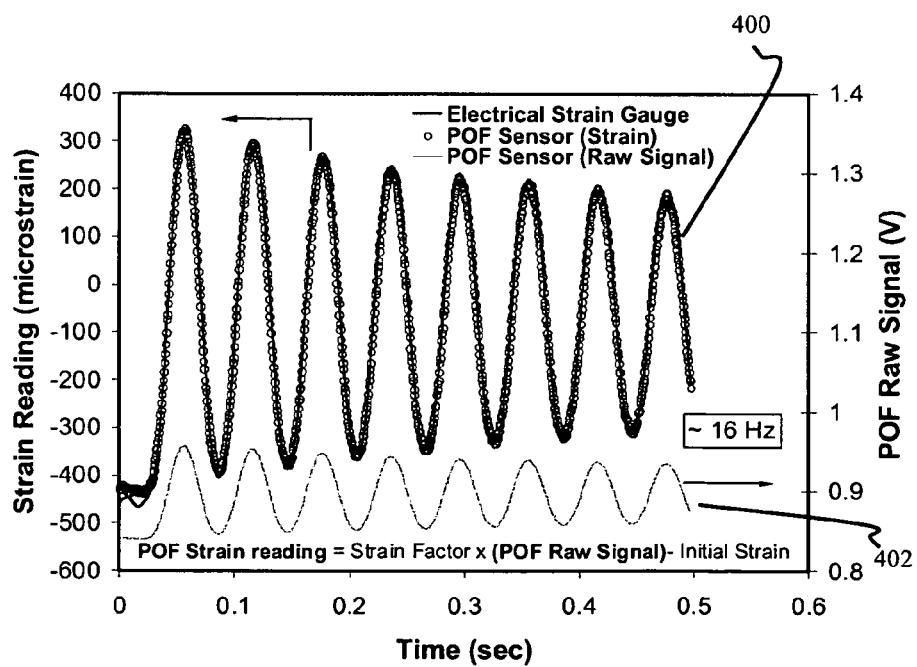
FIG. 4 shows a plot showing the excellent agreement between the POF sensor and the electrical strain gauge under a free vibration loading.
Figure 5:
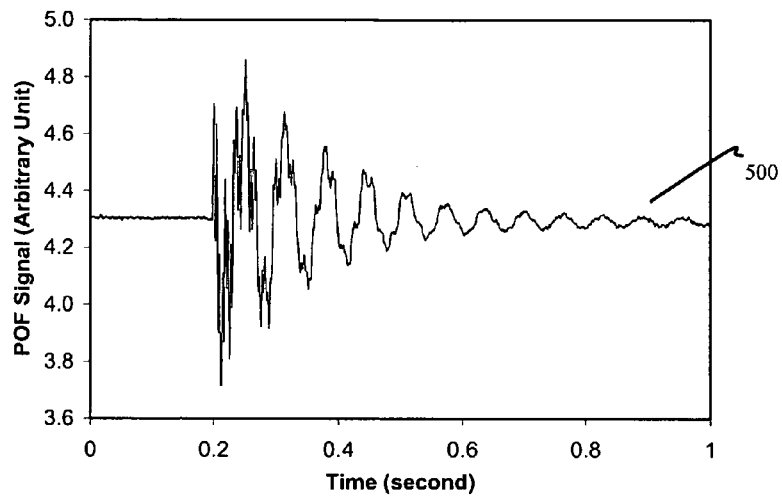
FIG. 5 shows a plot showing the response of the surface bonded POF signal during an impact-type excitation on a cantilever beam.
Figure 6:
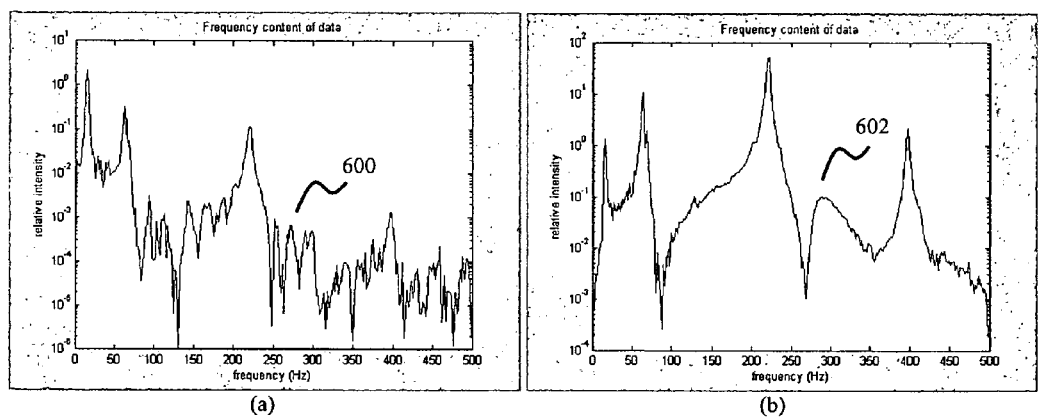
FIG. 6 shows a Fast-Fourier transform analysis of (a) the POF signal shown in FIG. 5 and (b) the corresponding piezofilm sensor signal.

FIG. 4 shows the strain response of a fluid-type sensor (curve 400) in an example embodiment (Solution B) and a collocated electrical strain gauge (used as a reference, curve 402) attached to a freely vibrating cantilever beam. An initial deflection was applied on the beam as an external excitation. The ability of the sensor of the example embodiment to monitor the eigen-frequencies of a cantilever beam is shown by the response (curve 500) of the sensor in FIG. 5. A fast-Fourier transform analysis of the POF signal 500 reveals the first four modes of natural frequencies as shown (curve 600) in FIG. 6a. The result obtained using a piezo-type sensor (curve 602 in FIG. 6b) collocated with the POF sensor serves to highlight the accuracy of the optical sensor in detecting the eigen-frequencies of a mixed mode dynamic response of the host structure.

Figure 7:
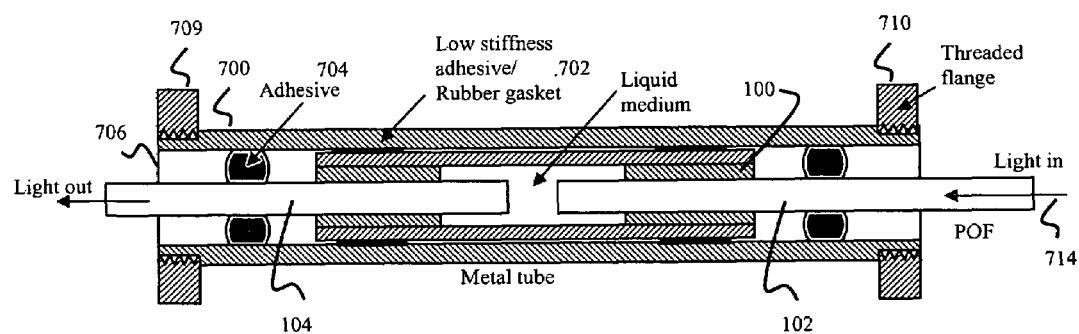
FIG. 7 is a schematic drawing of the plastic optical fiber sensor with encapsulation for embedding in concrete structures

The optical fiber sensor 100 (FIG. 1) may be encapsulated within a metal tube 700 as shown in FIG. 7. The sensor housing 100 is positioned at the centre of the metal tube 700 and held in place using a low stiffness adhesive 702 or an appropriately sized rubber gasket to ensure no slippage of the sensor 100 from the metal tube 700 during handling. The plastic optical fibers 102, 104 are affixed to the metal tube or housing 700 using a high stiffness adhesive 704 (e.g. high strength epoxy). The epoxy fillings 704 may be extended to flush to the exit surface e.g. 706 of the ends of the metal tube 700. Buffer tubes (not shown) and protective rubber boots (not shown) may be incorporated to improve the overall packaging ruggedness. Flanges 709, 710 may be threaded onto the ends of the metal tube 700 to ensure an efficient transfer of strain from the host to the sensor when embedded within a structure. The incident optical signal 714 from a light source (not shown) is launched from one end of the housing 700 and transmitted to the other end of the housing 700.

Figure 8:
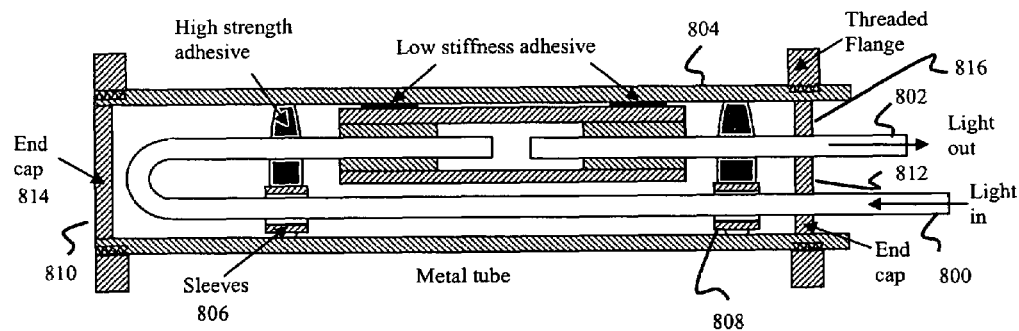
FIG. 8 is a schematic drawing of the single-ended plastic optical fiber sensor with encapsulation for embedding in concrete structures

Another embodiment of the present invention is shown in FIG. 8 whereby the ingress and egress of optical fibers 800, 802 are on the same side of a metal housing 804. In this embodiment, two sleeves 806, 808 are incorporated in the transmitting fiber 800 whereby the sleeves 806, 808 may move freely relative to the fiber 800 without significant resistance in the longitudinal direction when strained. This may eliminates any strain contribution resulting from undesired deformation of the optical fiber 800. The ends 810, 812 of the metal housing 804 may be sealed with e.g. metal or polymer caps 814, 816. As with the previous embodiment, buffer tubing and protective rubber boots (not shown) may be incorporated to further protect the optical fibers 800, 802.

Figure 10A:
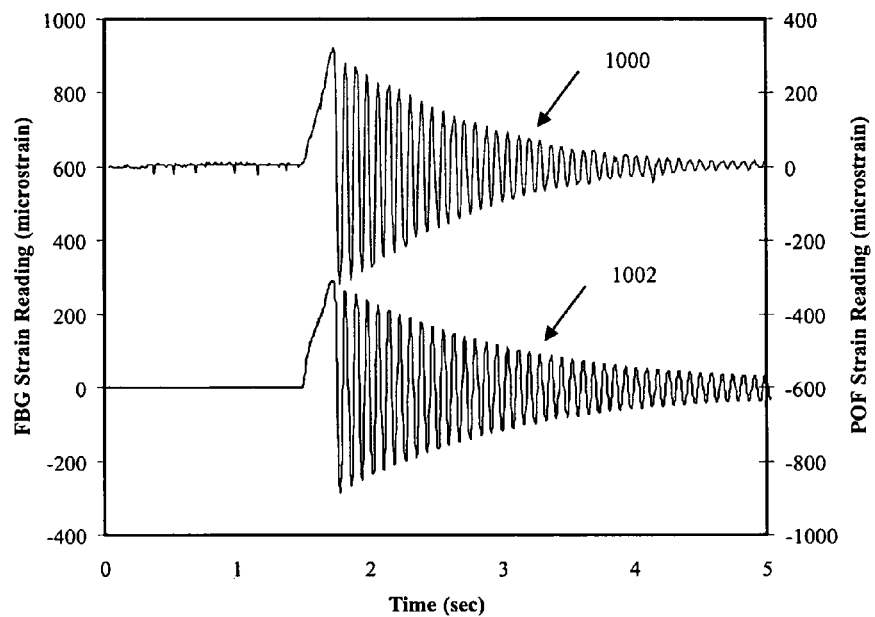
FIG. 10(a) shows a plot comparing the free vibration response of the POF sensor and a FBG sensor.
Figure 10B:
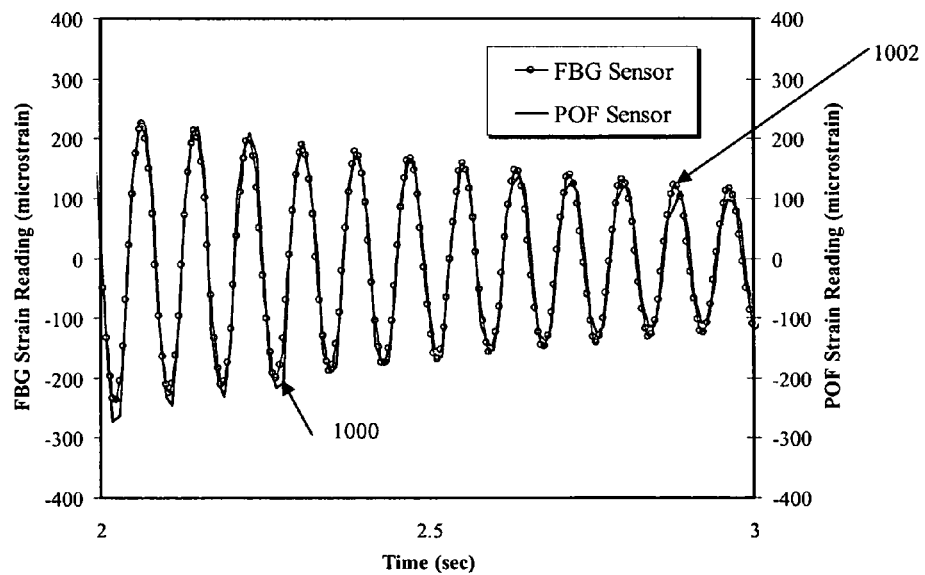
FIG. 10(b) shows a detail of FIG. 10(a).

With reference to FIGS. 10(*a*) and (*b*), the free vibration response of a POF sensor according to an example embodiment (Solution B used as fluid) was also obtained (curve 1000) and compared to an Fiber Bragg Grating (FBG) sensor (curve 1002) located beside the POF sensor. The frequency of the free vibration was approximately 12.5 Hz. FIGS. 10(*a*) and (*b*) show the good agreement between the results of the two optical fiber sensors for almost the entire duration of the vibration. The excellent response of the POF sensor (curve 1000) as seen in FIG. 10(*b*) (amplified view of FIG. 10(*a*)) highlights the potential of embodiments of the invention for dynamic measurement of structural vibration for structural health assessment.

Figure 11:
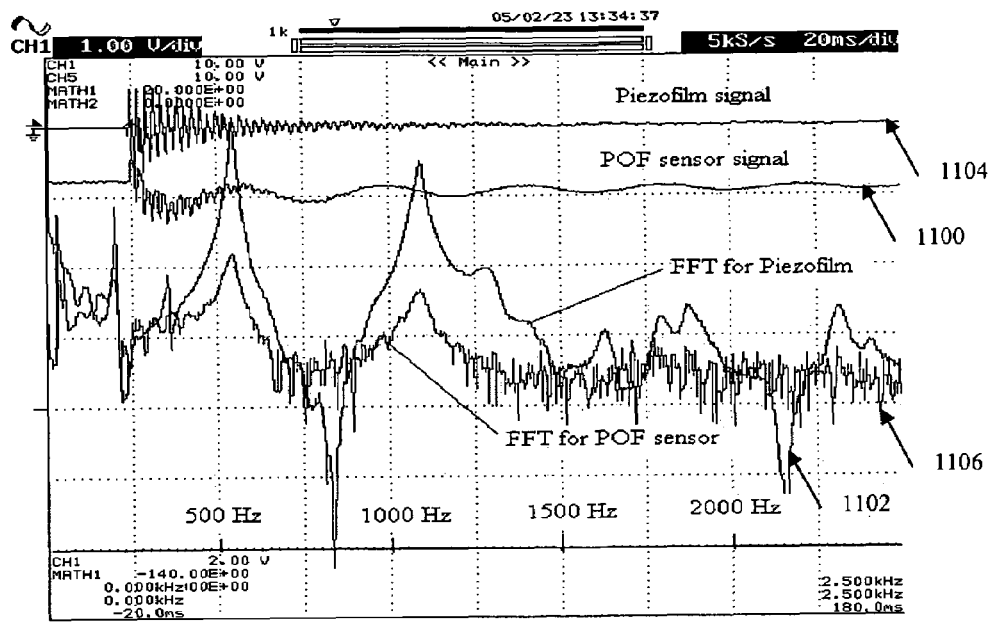
FIG. 11 shows a plot showing the impulse response and the corresponding FFT of the POF sensor and piezofilm attached to a stiff composite beam.

An impulse loading test was also carried out on a POF sensor according to an embodiment of the present invention (Solution B used as fluid) to assess the frequency bandwidth. The POF sensor and a piezofilm sensor as a reference were attached to a stiff composite beam and the respective impulse responses and the corresponding FFT results are shown in FIG. 11. From the plot, it is clear that the results of the POF sensor (impulse response curve 1100, FFT curve 1106) compares well with that of the piezofilm sensor (impulse response curve 1104, FFT curve 1102) and it is evident that the highest frequency detectable by the POF sensor is in excess of 1 kHz.

Figure 12:
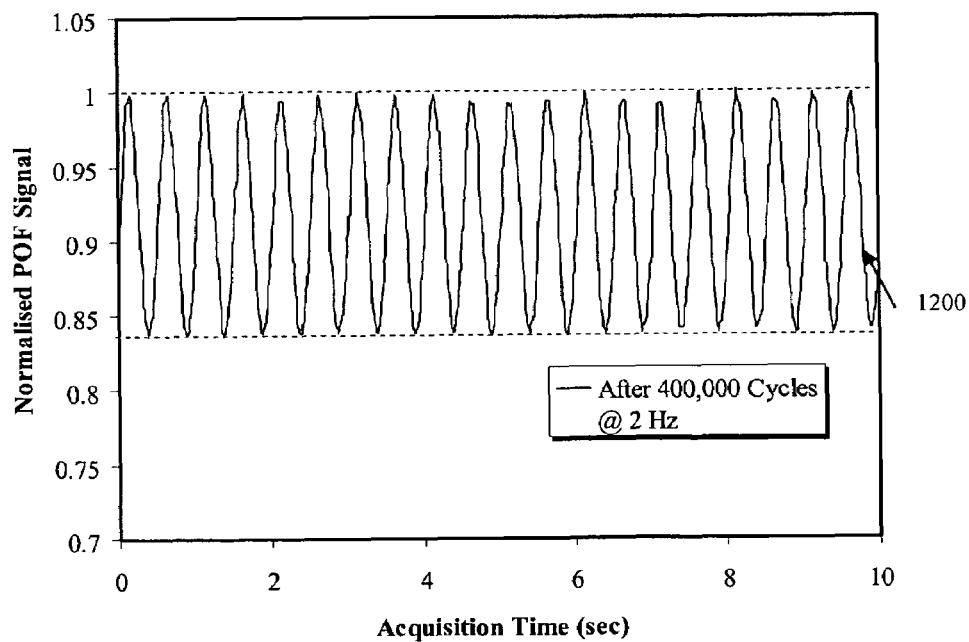
FIG. 12 shows a plot showing the response of a POF sensor following 400,000 cycles of repeated flexural loading.

FIG. 12 shows the response of the POF sensor according to an example embodiment (fluid-filled design using Solution B) during a cyclic flexural test where the sensor was attached to the lower side surface of a reinforced concrete beam after 400 thousand cycles. The signal change (i.e. peak to peak of curve 1200) corresponds to a strain value of approximately 1000 microstrain based on the readings of an FBG sensor located in the vicinity. The cyclic flexural test results highlight the functional durability of the POF sensor and render it feasible for field applications.

The embodiments described seek to address a number of the drawbacks of existing systems. In view of the inherent susceptibility of glass-based optical fiber to fracture, the embodiments of the present invention utilize polymer-based optical fibers which offer significantly greater ease of handling, particularly in harsh engineering environment with virtually no risk of fiber fracture. Polymer-based fibers are also suitable for use in corrosive concrete environment as they possess high resistance to the detrimental effects of the presence of chloride, alkaline and in particular moisture. In addition, high quality termination of plastic optical fibers can be achieve with relative ease without the need for polishing, that being the case with glass-based fibers. Another advantage of embodiments of the present invention over a number of existing designs may be that the optical fiber is used without the removal of the cladding layer or core of the fiber either mechanically or chemically to sensitize the fiber to the external perturbation to be monitored. Lastly, the embodiments of the invention disclose methods to improve the sensor sensitivity to axial strain (e.g. fluid type embodiments) and presents a simplification in the sensor fabrication process compared to most existing designs. The combination of these features renders embodiments of the present invention a highly cost-effective solution to the sensing need in structural health monitoring applications.

Embodiments of the invention reveal a number of design improvements introduced to optimize the functional and fabrication aspect of the optical fiber-based sensor for structural health monitoring. For example, the employment of polymer-based optical fibers, a polymer-based housing and the use of a liquid medium within the air cavity of the housing in order to address the shortcomings of existing sensor designs.

Embodiments of the invention exhibit capability to measure static and dynamic strains in a variety of applications and may be further encapsulated in a second body especially for applications where the sensor is to be embedded in a structure.

Applications of Embodiments of the Invention Include:

(a) Civil Engineering: bridges, buildings, dams, flyovers, water treatment plans, cure monitoring of concretes/mortars, monitoring of retrofitting in composite wrap concretes structures.

(b) Oil and Gas Industry: oil and gas production and transportation (c) Geotechnical Engineering: soil movement, tunnels, aircraft runway, tunnels, liquid-containment tank, retaining wall and anchor (d) Marine industry: offshore platforms, harbour structures, LPG and LNG pressure compartments.

(e) Aerospace: vibration monitoring, fatigue damage monitoring, crack detection of aircraft parts.

Figure 9:
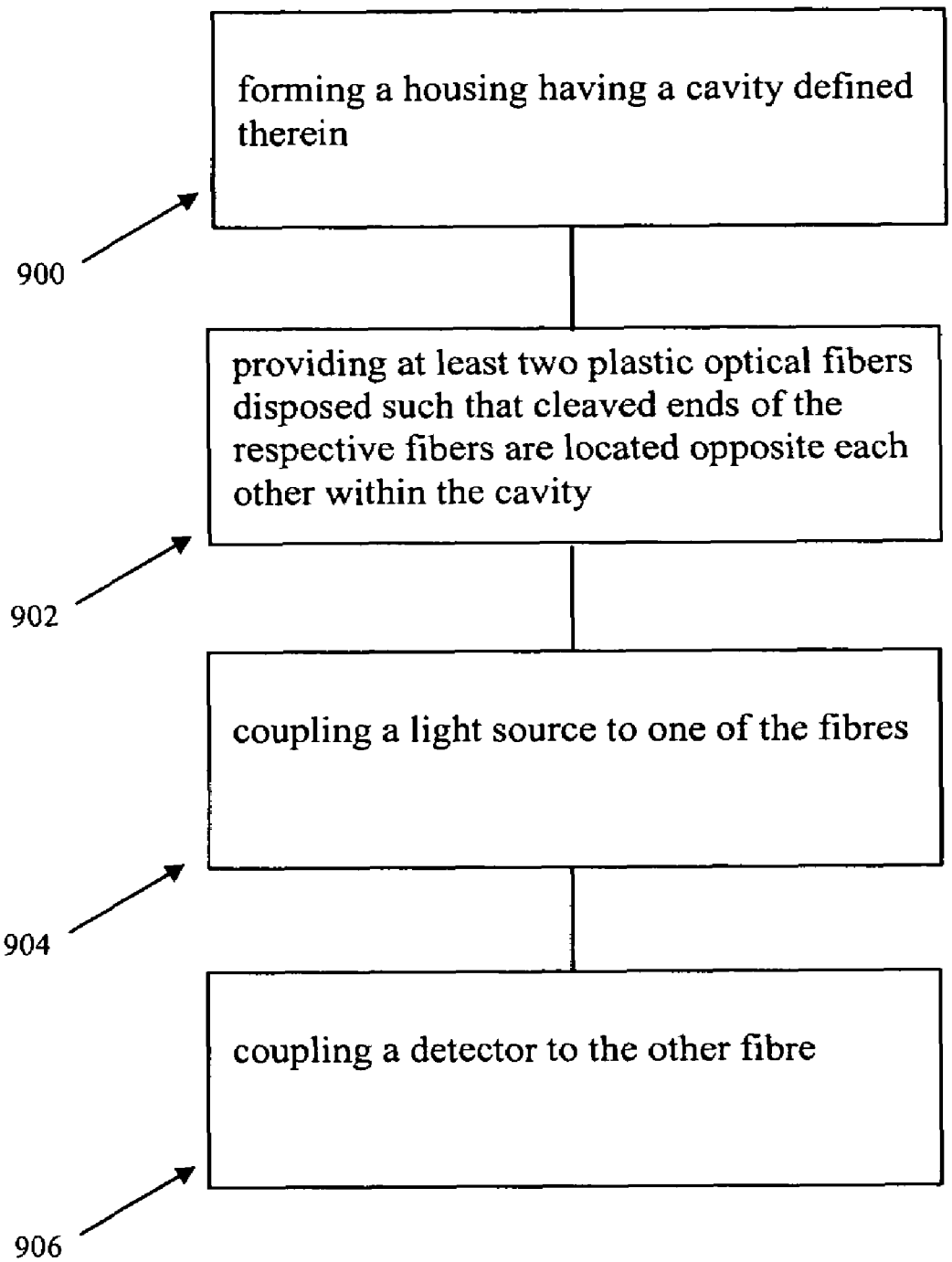
FIG. 9 shows a flow chart illustrating a method of fabricating an optical fibre sensor, according to an example embodiment.

FIG. 9 shows a flow chart illustrating a method of fabricating an optical fibre sensor, according to an example embodiment. At step 900, a housing having a cavity defined therein is formed. At step 902, at least two plastic optical fibers are provided, disposed such that cleaved ends of the respective fibers are located opposite each other within the cavity. A fluid medium such as a liquid may be injected into the cavity using e.g. a syringe and a slight gap (depending on the expected compressive strain) between the cleaved ends of the fibers may be incorporated to cater for compressive strains between steps 902 and 904. At step 904, a light source is coupled to one of the fibres, and at step 906, a detector is coupled to the other fiber.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. For example, it will be appreciated that two or more housings with two protruding lengths of fiber each may be interconnected, e.g. in series between a light source and detector. Also, more than two fibers may be incorporated in a single housing.

The invention claimed is:

1. An optical fiber sensor comprising:
a housing having a cavity defined therein;
at least two plastic optical fibers disposed such that cleaved ends of the respective fibers are located opposite each other within the cavity and such that each cleaved end is moveable with respect to the housing;
a light source coupled to one of the fibers;
a detector coupled to the other fiber; and
means for securing each fiber to a host structure such that strain applied to the host structure results in a variation of a separation distance between the cleaved ends of the respective fibers.

2. The sensor as claimed in claim 1, wherein the cavity is filled with an opaque fluid.

3. The sensor as claimed in claim 1, wherein the housing is made from plastic material.

4. The sensor as claimed in claim 3, wherein the housing comprises a plastic tube and two plastic sleeves inserted in the plastic tube at opposite ends thereof, wherein each plastic sleeve receives one of the fibers.

5. The sensor as claimed in claim 1, further comprising a casing accommodating the housing, and each fiber is secured to the casing as the host structure such that strain applied to the casing results in a variation of the separation distance between the cleaved ends of the respective fibers.

6. The sensor as claimed in claim 5, wherein the housing and each fiber are secured to an inner surface of the casing.

7. The sensor as claimed in claim 6, wherein the fibers protrude from opposite ends of the casing.

8. The sensor as claimed in claim 6, wherein the fibers protrude from the same end of the casing.

9. The sensor as claimed in claim 1, wherein the fibers are made from polymethyl methacrylate, polycarbonate or CYTOP®.

10. The sensor as claimed in claim 1, wherein the cleaved ends of the respective fibers are separated by a gap in a quiescent state of the sensor.

11. The sensor as claimed in claim 3, wherein the plastic material comprises polytetrafluoroethylene, polystyrene, or polypropylene.

12. A method of fabricating an optical fiber sensor, the method comprising:
forming a housing having a cavity defined therein;
providing at least two plastic optical fibers disposed such that cleaved ends of the respective fibers are located opposite each other within the cavity and such that each cleaved end is moveable with respect to the housing;
coupling a light source to one of the fibers;
coupling a detector to the other fiber; and
securing each fiber to a host structure such that strain applied to the host structure results in a variation of a separation distance between the cleaved ends of the respective fibers.

13. The method as claimed in claim 12, further comprising injecting an opaque fluid medium into the cavity.

14. The method as claimed in claim 12, wherein a gap is provided between the cleaved ends of the respective fibers.

15. A method of sensing utilising an optical fiber sensor, the method comprising detecting the intensity of a light signal after propagation of the light signal through at least two plastic optical fibers disposed such that cleaved ends of the respective fibers are located opposite each other and such that each cleaved end is moveable with respect to the housing, wherein the light signal is emitted from the cleaved end of one fiber and received via the cleaved end of the other fiber and wherein each fiber is secured to a host structure such that strain applied to the host structure results in a variation of a separation distance between the cleaved ends of the respective fibers.

* * * * *